June 27, 1939.  G. S. SCHAIRER  2,163,893
AUTOGIRO ROTOR HUB
Filed March 1, 1937  5 Sheets-Sheet 1

INVENTOR.
GEO. S. SCHAIRER
BY
ATTORNEY.

June 27, 1939.   G. S. SCHAIRER   2,163,893
AUTOGIRO ROTOR HUB
Filed March 1, 1937   5 Sheets-Sheet 2

INVENTOR.
GEO. S. SCHAIRER
BY
A. E. Wilson.
ATTORNEY.

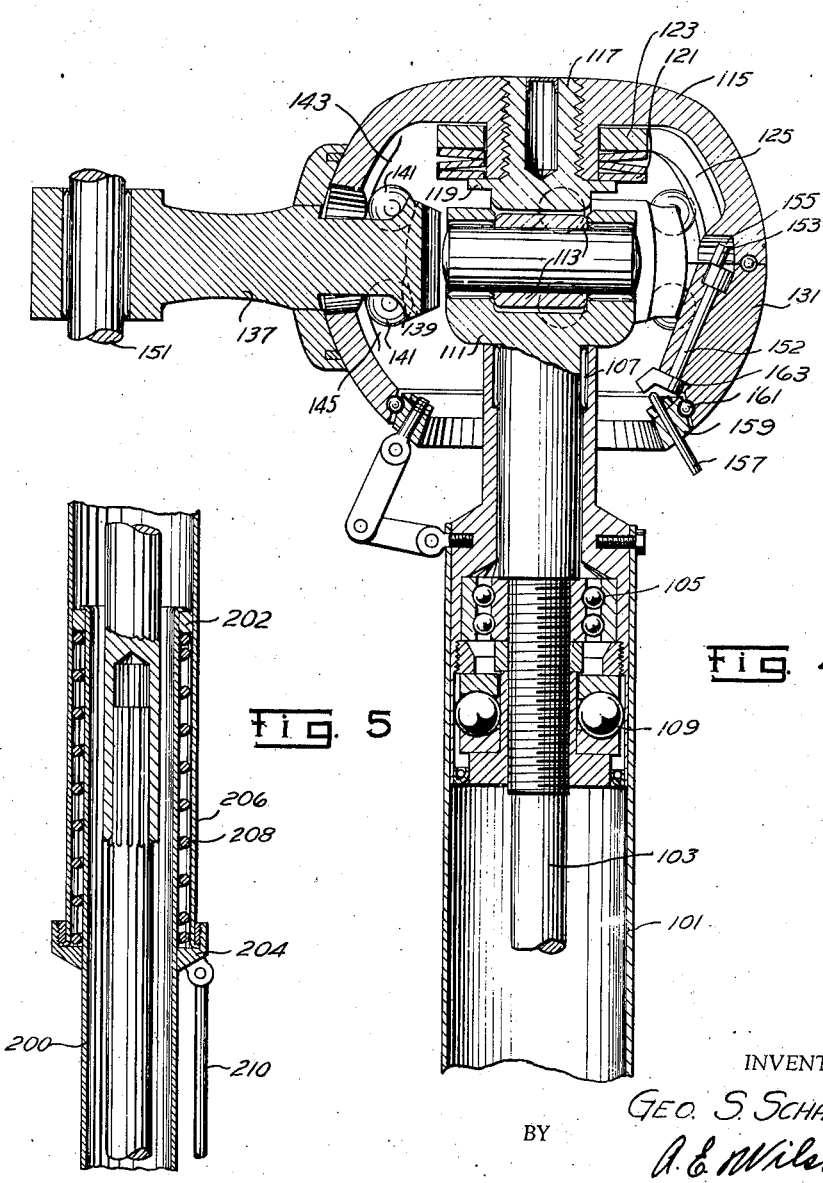

June 27, 1939.  G. S. SCHAIRER  2,163,893
AUTOGIRO ROTOR HUB
Filed March 1, 1937  5 Sheets-Sheet 4

INVENTOR.
GEO. S. SCHAIRER
BY  R. E. Wilson.
ATTORNEY.

June 27, 1939.  G. S. SCHAIRER  2,163,893
AUTOGIRO ROTOR HUB
Filed March 1, 1937  5 Sheets-Sheet 5
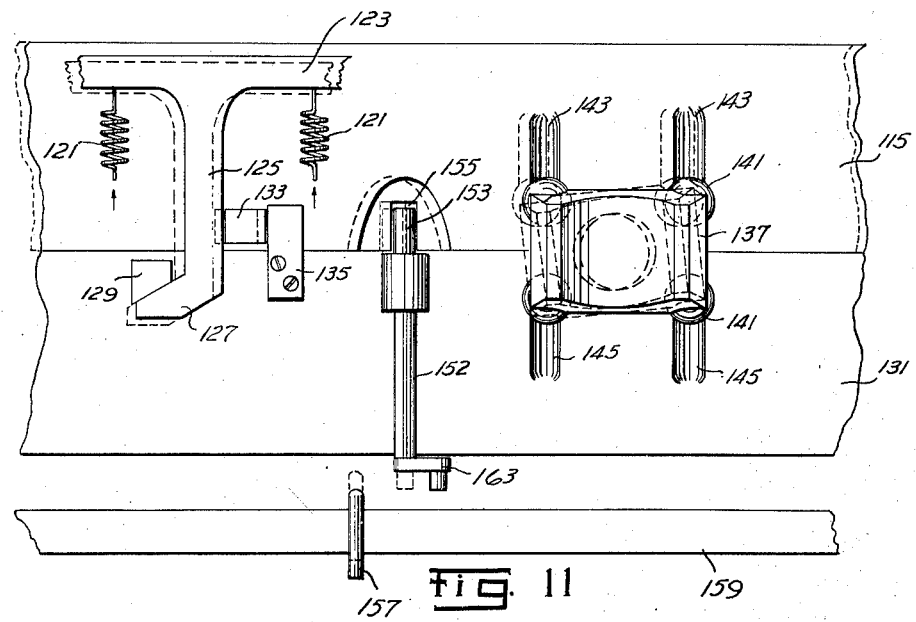
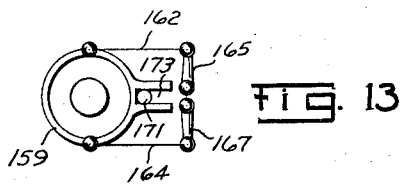
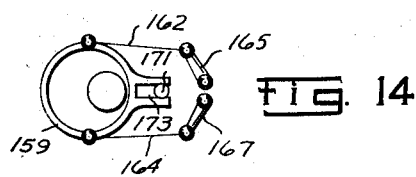
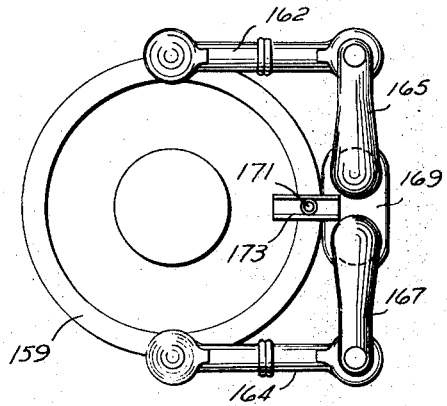
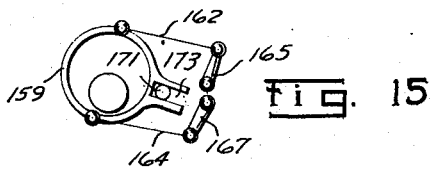
INVENTOR.
GEO. S. SCHAIRER
BY
ATTORNEY.

Patented June 27, 1939

2,163,893

UNITED STATES PATENT OFFICE 2,163,893

AUTOGIRO ROTOR HUB

George S. Schairer, South Bend, Ind., assignor to Bendix Products Corporation, South Bend, Ind., a corporation of Indiana Application March 1, 1937, Serial No. 128,398

18 Claims. (Cl. 244—18)

This invention relates to aircraft and more particularly to rotor hubs for rotary winged aircraft.

In the use of rotary winged aircraft it is desirable to control the angle of incidence of the rotating wings in such a manner that the angle of incidence of the rotating wings may be varied simultaneously and identically while the wings are rotating.

It is desirable that the angle of incidence of the rotating wings may be decreased while the aircraft is on the ground to permit of the storing of sufficient energy in the wings to permit a rapid or generally substantially vertical take-off. When the rotating wings have been speeded up to a rotational speed consistent with storing sufficient energy to effect the desired take-off, it is desirable that the angle of incidence of the wings be increased to a maximum operating angle considerably higher than the normal operating angle to effect the take-off. When the aircraft has reached a desired altitude, and the energy stored in the rotating wings has been partially dissipated, it is desirable to progressively decrease the angle of incidence of the wings to a normal operating angle. To obtain best results it is, of course, desirable that the angles of incidence of all of the wings be equal at all times to insure that each of the wings will exert equal lifting force.

An object of this invention is therefore to provide a hub for a rotary winged aircraft wherein the angles of incidence of each of the rotating wings may be varied simultaneously and by equal amounts.

A further object is to provide means for varying the angles of incidence of the rotating wings of rotary winged aircraft by rotating two sets of blade supporting races with respect to each other.

Another object of the invention is to provide a novel two-part hub having blade anchoring means including curved raceways carried by each part of the hub.

A still further object of the invention is to provide manually operable means to decrease the angle of incidence of the rotating wings to substantially zero to permit the storing of energy in the rotating wings preparatory to take-off, means to increase the angles of incidence of the wings to a point considerably above the normal operating angles to effect a jump take-off, and means to slowly progressively decrease the angles of incidence to the normal operating angles.

Another object is to provide speed responsive means to prevent the angles of incidence of the rotating wings from decreasing below the normal operating angles while the aircraft is in flight.

Yet a further object of the invention is to provide manually operable means to increase the angles of incidence of the rotating wings to a point considerably above the normal operating angles to obtain a braking action during a substantially vertical descent.

Another object of the invention is to provide a resiliently mounted pylon between the fuselage and wings of a rotary winged aircraft, operably connected to the rotary wing angle of incidence control means to vary the angles of incidence of the rotating wings when the aircraft is subjected to unusual forces while in flight.

A still further object of the invention is to provide anti-friction means to permit vertical articulation of the rotating wings of rotary winged aircraft about the center of the hub.

Yet a further object is to provide novel control means to steer a rotary winged aircraft.

Another object of the invention is to provide means to tilt the rotating wings of rotary winged aircraft about the center of the hub to steer the aircraft.

A further object of the invention is to provide a hub for a rotary winged aircraft having yielding means urging the wings toward a high angle of incidence position, and manually releasable locking means to hold the wings in a low angle of incidence position.

Other objects and advantages of this invention will be apparent from the following detailed description of two illustrative embodiments thereof, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 4 is a view similar to Figure 1 showing a modified form of the invention;

Figure 5 is a vertical section of a resiliently mounted pylon designed to be positioned between the fuselage and rotating wings of rotary winged aircraft to influence the control of the angles of incidence of the rotating wings;

Figure 11 is an inside diagrammatic layout view of the wing angle of incidence control mechanism shown in Figure 4;

Figure 12 is a sectional view of a portion of the control mechanism for varying the angle between the rotating wings and the fuselage of a rotary winged aircraft;

Figure 13 is a diagrammatic view of the control mechanism shown in Figure 12 with the mechanism shown in the neutral position;

Figure 14 is a view similar to Figure 13 with the mechanism shown in one extreme operating position; and Figure 15 is another view, similar to Figure 13, with the mechanism shown in another extreme operating position.

Figure 1:
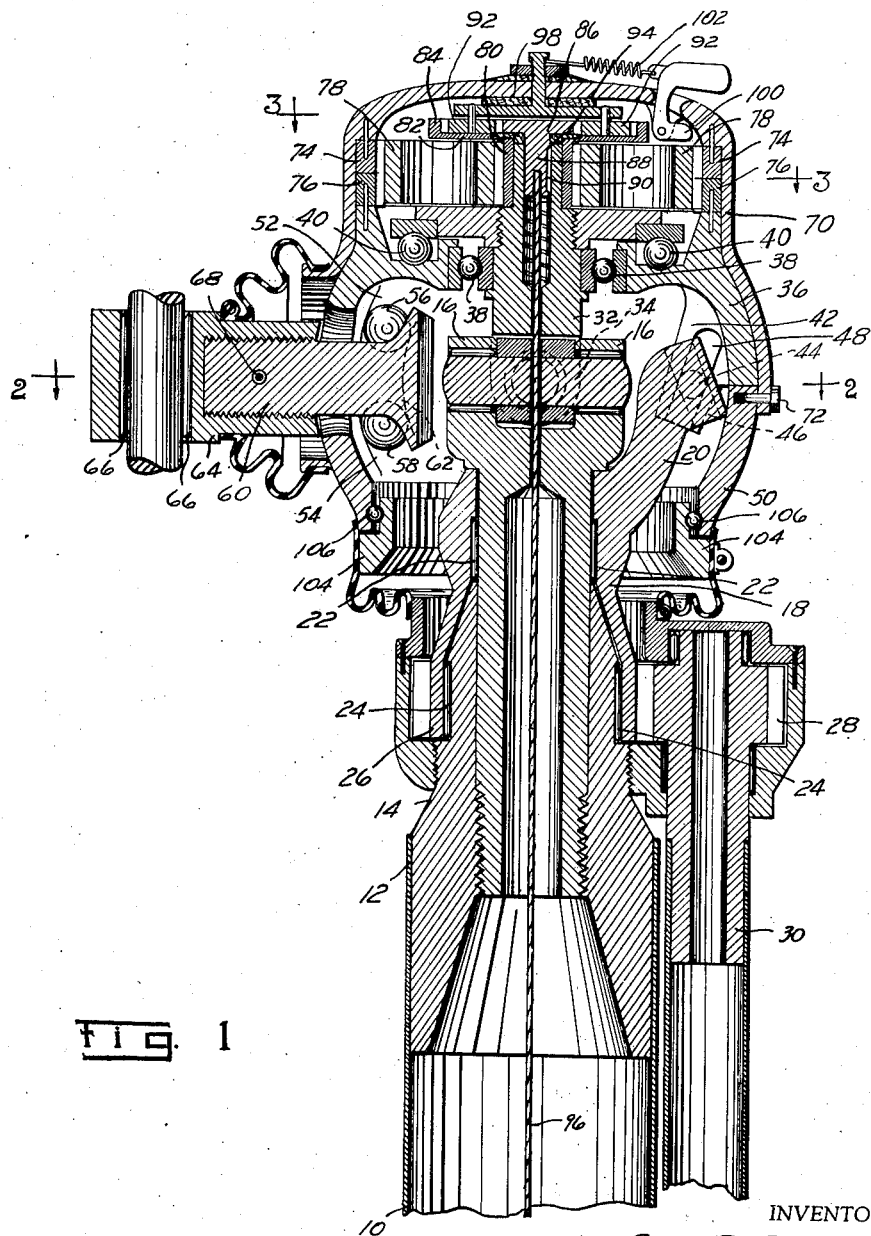
Figure 1 is a vertical section of a hub for a rotary winged aircraft embodying the present invention.
Figure 2:
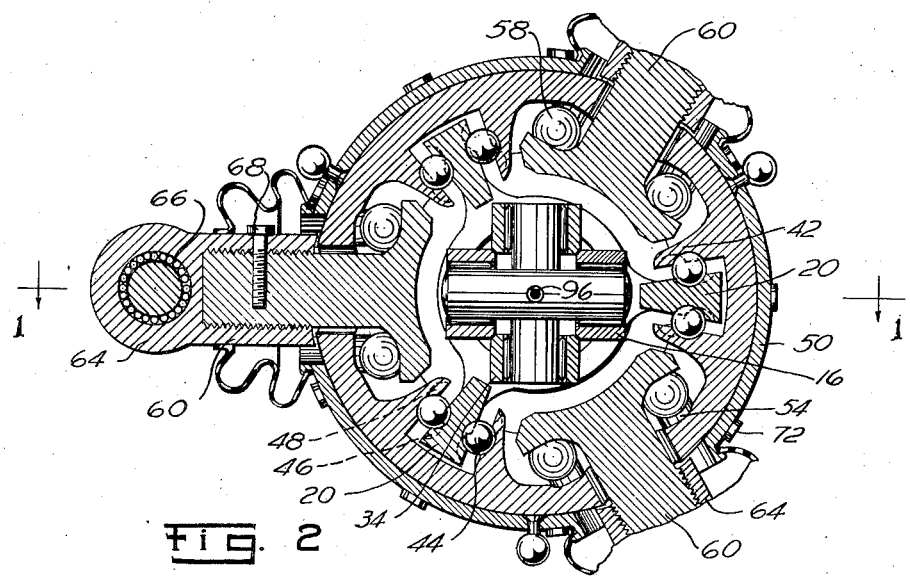
Figure 2 is a view taken substantially on the line 2—2 of Figure 1.
Figure 3:
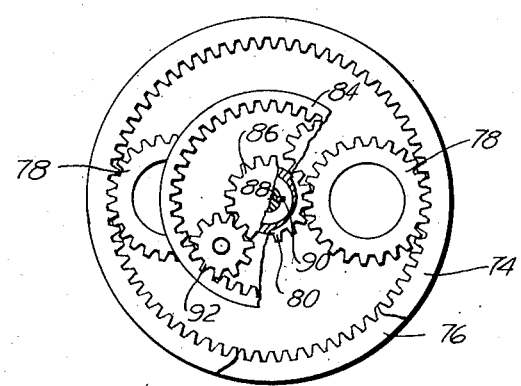
Figure 3 is a plan view, partly in section, of the hub shown in Figure 1 with the upper shell member removed.
Figure 6:
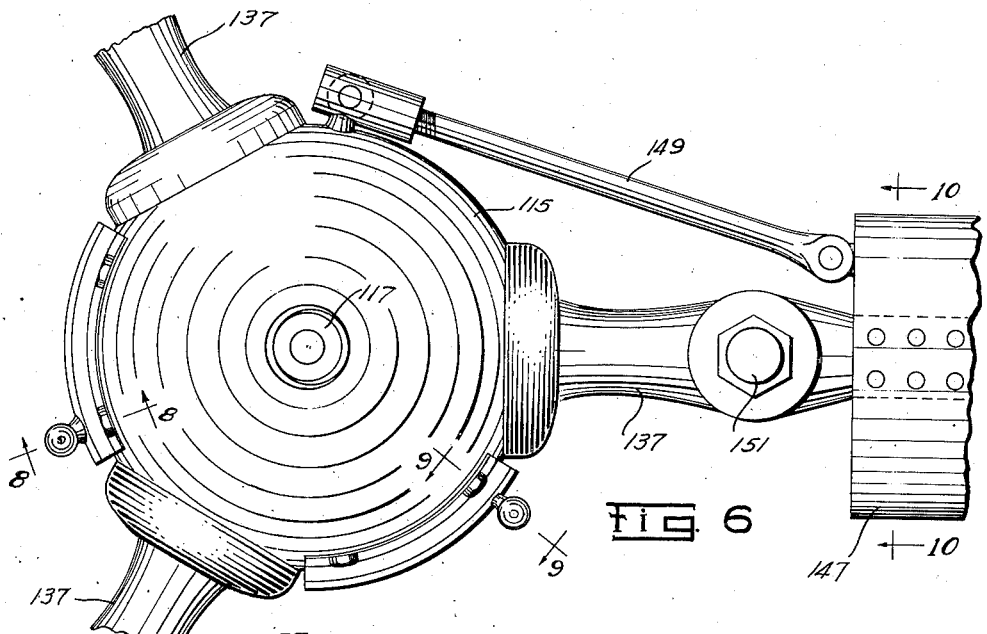
Figure 6 is a plan view of the hub shown in Figure 4.

Referring more particularly to Figures 1 to 3, there is shown for purposes of illustrating this invention, a rotor hub for a rotary winged aircraft mounted in a pylon 10 fixed to the fuselage of the craft.

A member 12 is welded or otherwise fixedly secured in the pylon 10, and receives a shaft member 14 having a pair of universal joint yokes 16 fixed thereto. A driving sleeve 18 having spaced arms 20 is received over the shaft 14 and member 12 and is separated therefrom by needle bearings 22 and 24. The driving sleeve 18 is provided with a geared pinion 26 which meshes with a pinion 28 carried by a shaft 30 adapted to be driven by the engine or prime mover of the craft.

A stub shaft 32 having a pair of universal joint yokes 34 operably connected to the joint yokes 16 is provided in the central portion of the hub. An intermediate shell member 36 is positioned around the stub shaft 32 and is separated therefrom by ball and thrust bearings 38 and 40 respectively. The intermediate shell member 36 is provided with a plurality of spaced arms 42 adapted to engage the spaced arms 20 carried by the driving sleeve 18 to impart driving force from the sleeve 18 to the shell 36. The driving force is imparted through balls 44 positioned in cooperating raceways 46 and 48 formed in the arms 20 and arms 42 respectively. The shell 36 is therefore driven at uniform velocity by the driving sleeve 18.

A lower shell member 50 is positioned adjacent and beneath the intermediate shell member 36. The intermediate and lower shell members 36 and 50 are formed with cooperating generally vertically disposed curved raceway segments 52 and 54 respectively adapted to receive balls 56 and 58 respectively. A plurality of rotary wing root segments 60 having spaced raceways 62 formed at their inner ends project through apertures in the intermediate and lower shell members 36 and 50 and engage the balls 56 and 58 carried by the shell members. The rotor wings are free to roll on the balls 56 and 58 to oscillate vertically. It will be observed that the raceways 52, 54, and 62 are so proportioned that the rotor wings oscillate about the center of the hub.

A wing attaching segment 64 having an aperture at one end fitted with needle bearings 66 is threaded or otherwise suitably secured to the wing root segment 60. The attaching segment 64 may be prevented from rotation with reference to the root segment 60 in any desired manner as by means of a bolt 68.

The angle of incidence of the rotor wing carried by the attaching segment 64 may be varied by rotating the lower shell 50 with reference to the intermediate shell 36, thereby displacing the raceways 52 and 54 formed in the intermediate and lower shells laterally to vary the effective vertical angle of the raceway 62 formed at the inner end of the wing root segment 60.

An upper shell member 70 is positioned to overlie the intermediate shell member 36, and is fixed to the lower shell member 50 in any desired manner as by means of bolts 72. A pair of ring gears 74 and 76 are carried by and fixed to the upper shell member 70 and the intermediate shell member 36 respectively. The ring gears 74 and 76 have a different number of teeth, such, for example as seventy one and sixty nine, respectively. A pair of planet gears 78 positioned on opposite sides of the shaft 32 mesh with both of the ring gears 74 and 76 and with a centrally disposed pinion 80. The pinion 80 is provided at its upper end with a web 82 which carries an internally toothed sun gear 84.

A pinion 86 is fixed to the shaft 32 in any desired manner as by a plunger 88 and a key 90. The pinion 86 meshes with a pair of interconnected pinion gears 92 which also mesh with the sun gear 84. Means including a friction connection 94 between the pinion 86 and the web 82 are provided to lock the pinion 86 to the pinion 80 and to the sun gear 84. The pinion 86 is of course restrained from rotation while the device is in operation, whereas the gears 74, 76, 78, 80 and 84 rotate with the shells 36 and 70. The pinions 92 are driven at a speed intermediate the speed of the sun gear 84 and the fixed gear 86.

Means including a cable 96, extending longitudinally through the hub, are provided to urge the pinion 86 into engagement with the web 82. When the cable 96 is actuated to operate the friction connection 94, the pinion 80 and sun gear 84 rotate at slower speed, or are held against rotation. The planet gears 78 then rotate backward with reference to the ring gears 74 and 76, thereby rotating the lower shell 50 with reference to the intermediate shell 36 to displace the generally vertically disposed raceways 52 laterally with reference to the raceways 54 to increase the pitch of the wing root segments 60 and therefore to increase the angle of the rotary wings fixed thereto.

A friction connection 98 is provided between the pinion gears 92 and the upper shell 70. When the cable 96 is released the pinion 80 and the sun gear 84 are released, whereupon the friction connection 98 tends to rotate the interconnected pinions 92 and the sun gear 84 ahead of the ring gears 74 and 76. The planet gears 78 are therefore urged to move ahead with reference to the ring gears 74 and 76, whereupon rotation is effected between the intermediate shell 36 and the lower shell 50 to displace the raceway segments 52 and 54 laterally to decrease the angles of incidence of the rotary wing segments operably connected thereto.

A centrifugally actuated stop member 100 is provided to engage the planet gears 78 to prevent the wing angle of incidence from being decreased below a predetermined limit while the craft is in flight. When the hub stops rotating after a landing has been effected, a spring 102 moves the centrifugally actuated stop 100 out of engagement with the planet gears 78 to permit further relative rotation between the intermediate shell 36 and the lower shell 50 to permit a reduction of the angle of incidence of the rotor wings to store energy to effect the next take-off.

The hub, including the lower shell 50, the intermediate shell 36 and the upper shell 70, may be turned about the yokes 16 and 34 of the universal joint to obtain longitudinal and lateral control of the craft by means of a ring 104 positioned adjacent the lower shell 50, and separated therefrom by means of bearings 106. Any desired means may of course be employed to displace the ring 104 to effect the desired control, such, for example as that disclosed in Figures 12 to 15, or that disclosed in my copending application Serial No. 68,719, filed March 13, 1936.

It will be observed that the mechanism controlling the angle of incidence of the rotating wings operates to permit the angle of incidence of the wings to be decreased to approximately zero while the craft is on the ground to permit driving of the rotating wings at a speed above the normal driving speed to store sufficient energy in the wings to facilitate a jump take-off. When the wings are rotating at the desired speed, the angle of incidence may be increased considerably above the normal operating angle to effect the take-off, and when a desired altitude has been reached the angles of incidence of the wings may be progressively decreased to the normal operating angles. The centrifugally actuated stop member operates to prevent the angles of incidence from being decreased below the normal operating angles while the craft is in flight. The angles of incidence of the wings may be increased considerably above the normal operating angles to interpose a braking action during descent, and after the craft has landed, the angles of incidence of the rotating wings, if desired, being decreased to permit the storing of energy in the rotating wings to effect the next jump take-off.

It will be understood of course that any desired means other than that shown may be employed to rotate the intermediate shell 36 with reference to the lower shell 50 to vary the angles of incidence of the rotating wings. Such means may be actuated in any desired manner as by electrical or hydraulic means.

In the modified embodiment of the invention illustrated in Figures 4 to 15, a two-part hub only is employed.

In this embodiment of the invention a pylon 101 fixed to the fuselage of the aircraft houses a driving shaft 103. The shaft 103 is guided and supported in the pylon 101 by bearings 105, needle bearings 107, and thrust bearings 109. The upper end of the shaft 103 is provided with universal joint yokes 111 which cooperate with oppositely disposed universal joint yokes 113 to drive the hub at any desired angle to which it may be moved with reference to the pylon 101.

An upper shell member 115 is threaded or otherwise fastened to a stub shaft 117 having the yokes 113 at their lower end. The stub shaft 117 is provided with a flange 119 which receives one end of a spring 121 which may take the form of a plurality of cone washers. The other end of the spring 121 bears on a flange 123 having a plurality of downwardly projected arms 125. As shown diagrammatically in Figure 11 the lower ends of the arms 125 are provided with bevelled segments 127 which engage correspondingly bevelled stops 129 carried by a lower shell member 131, and stops 133 carried by the upper shell member 115 to hold the lower shell 131 into engagement with the upper shell 115 and to rotate the lower shell 131 with reference to the upper shell when the flange 123 is moved vertically. Stops 135 carried by the lower shell 131 are provided to engage the stops 133 carried by the upper shell 115 to limit relative rotation between the shells and to prevent them from separating.

Rotary wing root segments 137 projecting through apertures in the upper and lower shells 125 and 131 are provided with generally vertically disposed raceways 139 to receive balls 141 which roll in generally vertically disposed raceway segments 143 and 145 formed in the upper and lower shell members 115 and 131 respectively. As the flange 123 is moved vertically the lower shell 131 rotates with reference to the upper shell 115, thereby displacing the raceway segments 143 and 145 laterally to vary the angle of incidence of the rotary wings 147 fixed to the root segments 137.

An adjustable link 149 interconnects the leading edge of the rotary wing 147 with the lower shell 131. When power is applied through the driving shaft 103 to drive the rotary wings 147, the wings 147 swing backwardly about the pivot connection 151 and exert tension on the link 149. The force transmitted through the link 149 rotates the lower shell 131 with reference to the upper shell 115 to decrease the angle of incidence of the wings 147.

Means are provided to lock the wings 147 in the substantially zero angle of incidence position to which they are urged when power is applied to rotate the wings.

A shaft 152 journalled in the lower shell 131 is provided with an eccentric 153 which engages in a slot 155 formed in the upper shell 115 when the shells 115 and 131 are moved to the zero angle of incidence position and the shaft 152 is rotated to move the eccentric 153 into the slot 155.

Means including a plunger 157, projecting through a ring 159 positioned adjacent the lower shell 131 and separated therefrom by bearings 161 are provided to engage a crank 163 carried by the shaft 152 to rotate the shaft 152 to turn the eccentric 153 in the slot 155.

In the operation of this device, the link 149 interconnecting the leading edge of the wing 147 rotates the lower shell 131 with reference to the upper shell 115 to decrease the angle of incidence of the wings 147 to substantially zero. The locking device including the eccentric 153 and the slot 155 hold the upper and lower shells 115 and 131 from rotating. The angle of incidence of the wings is held in the zero position until the wings have been speeded up to the desired degree, whereupon the plunger 157 is actuated to trip the crank 163 to rotate the shaft 151 and turn the eccentric 153 in the slot 155 away from its dead center position. The spring 121 then urges the flange 123 and the arms 125 upwardly, whereupon the bevelled segments 127 and the bevelled stops 129 urge the lower shell 131 to rotate with reference to the upper shell 115 to displace the raceway segments 143 and 145 laterally to increase the angle of incidence of the rotary wings 147.

Means are provided to vary the angle between the rotary wings 147 and the fuselage of the craft to obtain lateral and longitudinal control of the craft.

The ring 159 positioned adjacent and below the shell 131 may be actuated to displace the hub about the yokes 111 and 113 to obtain directional control of the craft.

Referring more particularly to Figures 12 to 15 it will be observed that a pair of links 162 and 164 engage the disc 159 on opposite sides thereof. A pair of cranks 165 and 167 journalled in a member 169 engage the links 162 and 164 respectively. A guiding member 171 fixed in the rings 159 slides in a pair of guides 173 fixed with reference to the pylon 101. Any suitable means may be employed to actuate the cranks 165 and 167 to move the ring 159 with reference to the pylon 101.

When the cranks 165 and 167 are moved in opposite directions as illustrated in Figure 14, the guiding member 171 moves in the guides 173 as shown to control the craft longitudinally. When the cranks 165 and 167 are moved in the same directions, as illustrated in Figure 15 the guiding member 171 does not move in the guides 173, but rather the ring 159 is displaced angularly as illustrated to effect lateral control of the craft.

Figures 7, 8, 9:
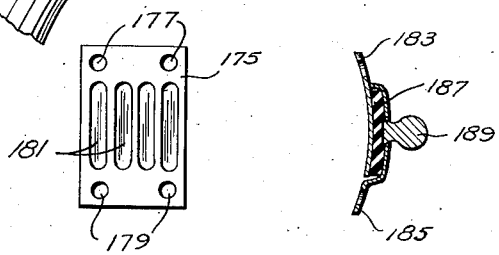
Figure 7 is a side elevation of a resilient member adapted to interconnect two sections of the hub.
Figure 8 is a view taken on the line 8—8 of Figure 6 of a modified form of resilient member.
Figure 9 is a view taken on the line 9—9 of Figure 6 showing a still further modified form of resilient member.

Figures 7, 8 and 9 illustrate alternative embodiments of resilient means to urge the upper and lower shells 115 and 131 to rotate with reference to each other to move the wings 147 to the high angle of incidence positions and also to hold them together.

In the embodiment illustrated in Figure 7, a plate 175 is provided with a plurality of apertures 177 adapted to receive fastening means to fix the plate to the upper shell 115, and with apertures 179 to receive fastening means to fix the plate to the lower shell 131. A plurality of resilient strips 181 resiliently urge the shells to rotate toward the high angle position.

In the embodiment illustrated in Figure 8, a pair of overlapping clamps 183 and 185 are designed to be fixed to the upper and lower shells 115 and 131 respectively. Resilient material 187 molded or otherwise secured to the clamps 183 and 185 urge the upper and lower shells 115 and 131 to rotate toward the high angle position. A ball 189 fixed to the clamp 185 which engages the lower shell 131 is adapted to receive one end of the link 149 interconnecting the lower shell of the hub and the leading edge of the wing 147.

The embodiment illustrated in Figure 9 is generally similar to that illustrated in Figure 8; however, it will be observed that a clamp 191 which engages the upper shell 115 is positioned to overlie the clamp 193 engaging the lower shell. In this embodiment the ball 195 which receives the link 149, projects through the resilient material 197 and is fixed to the clamp 193 fixed to the lower shell 131.

Figure 10:
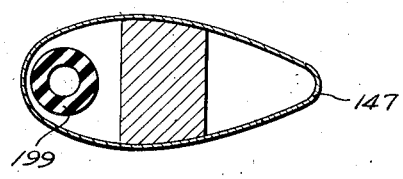
Figure 10 is a sectional view taken on the line 10—10 of Figure 6.

Referring to Figure 10 it will be observed that a resilient bushing 199 is fitted in the end of the leading edge of the wing 147 to receive the connection to the link 149 to interpose a resilient support between the link 149 and the wing 147.

Referring now to Figure 5, it will be observed that a pylon 200 fixed to the fuselage of the aircraft is provided at its upper end with a stop member 202. The stop member 202 cooperates with another stop member 204 carried by a hub supporting member 206 to engage a spring 208 or other resilient member therebetween. A link 210 connected to the supporting member 206 is operably connected to the wing angle of incidence control mechanism to vary the angle of incidence of the rotating wings when the craft is subjected to unnatural forces, such, for example, as air bumps while in flight. The operation of the wing angle of incidence control mechanism is thus influenced by the forces to which the craft is subjected to damp out or minimize the influence of such undesirable forces.

While the invention has been described with particular reference to a limited number of desirable embodiments, it is to be understood that various constructional changes may be made without departing from the spirit of the invention as defined by the following claims.

I claim:

1. In a hub to engage rotatable aircraft wings adapted to rotate at an angle of incidence and to oscillate vertically, a two-part rotatable shell, means engaging both parts of said shell to connect the wings to the hub, means to cause rotation between the two parts of the shell to change the angle of incidence of the wings, and means engaging both parts of the rotatable shell to enable the wings to oscillate vertically about the center of the hub.

2. In a hub to engage rotatable aircraft wings adapted to rotate at an angle of incidence, a rotatable shell including a plurality of rotatable parts, bearing surfaces in two adjacent parts, means engaging said bearing surfaces to connect the wings to the hub, means to cause rotation between said parts to change the angle of incidence of the wings, and means engaging said bearing surfaces to enable the wings to oscillate vertically about the center of the hub.

3. In a hub to engage rotatable vertically oscillatable aircraft wings adapted to rotate at an angle of incidence, a rotatable shell including a plurality of rotatable parts, means engaging a plurality of said parts to connect the wings to the hub in such manner that the wings may oscillate vertically about the center of the hub, means to cause rotation between said parts to change the angle of incidence of the wings, and means to prevent the angle of incidence of the wings from decreasing below a predetermined degree while the craft is in flight.

4. In a hub for rotatable aircraft wings adapted to rotate at an angle of incidence, a rotatable shell including two spaced sections having bearing surfaces therein, means engaging said bearing surfaces to connect the wings to the hub so that the wings may oscillate vertically about the center of the hub, and means to displace said sections to change the angle of incidence of the wings.

5. In a hub for rotatable aircraft wings adapted to rotate at an angle of incidence and to oscillate vertically, a rotatable shell including a plurality of spaced sections, means engaging a plurality of said sections to connect the wings to the hub, and means including a ring gear driven by the rotatable shell to displace said sections to change the angle of incidence of the wings.

6. In a hub for rotatable aircraft wings adapted to rotate at an angle of incidence, a rotatable shell comprising two spaced sections having bearing sections therein, means engaging said bearing sections to connect the wings to the hub, means including planetary gears to displace said sections to change the angle of incidence of the wings, and manually operable clutching means to effect operation of said planetary gears to effect a change in the angle of incidence of said wings.

7. A hub for a rotary winged aircraft having wings adapted to rotate at an angle of incidence comprising a rotatable shell including vertically spaced sections having bearing surfaces therein adapted to engage the rotatable wings, means engaging said bearing surfaces to vary the angle of incidence of the wings when said sections are rotationally displaced, and power operated means including planetary gearing driven by the rotatable shell to rotationally displace said sections.

8. A hub for a rotary winged aircraft having wings adapted to rotate at an angle of incidence comprising a rotatable shell including vertically spaced sections having bearing members therein adapted to engage the rotatable wings, means engaging said bearing members to vary the angle of incidence of the wings when said sections are rotationally displaced, ring gears carried by each of said sections, planetary gearing operably connected to the ring gears, and clutching means adapted to engage said planetary gearing to effect rotational displacement between said sections.

9. A hub for a rotary winged aircraft having wings adapted to rotate at an angle of incidence and free to oscillate vertically comprising a rotatable shell including vertically spaced sections adapted to engage the rotatable wings, means engaging said sections to vary the angle of incidence of the wings when said sections are rotationally displaced, ring gears having different numbers of teeth operably connected to each of said sections, planetary gearing operably connected to the ring gears, and clutching means adapted to engage said planetary gearing to effect relative rotation between said ring gears to vary the angle of incidence of the rotatable wings.

10. A hub for a rotary winged aircraft having wings adapted to rotate at an angle of incidence and free to oscillate vertically comprising a rotatable shell including vertically spaced sections adapted to engage the rotatable wings, means engaging said sections to vary the angle of incidence of the wings when said sections are rotationally displaced, ring gears having different numbers of teeth operably connected to each of said sections, planetary gearing operably connected to the ring gears, clutching means adapted to engage said planetary gearing to effect relative rotation between said ring gears to vary the angle of incidence of the rotatable wings, speed responsive stop means adapted to engage the planetary gearing to prevent the angle of incidence of the wings from being decreased below a predetermined angle while the craft is in flight, and manually operable means to actuate said clutching means to vary the angle of incidence of the wings.

11. In a hub for a rotary winged aircraft having wings adapted to rotate at an angle of incidence and to oscillate vertically, a rotatable shell including spaced sections, means to vary the angle of incidence of the wings upon rotational displacement of the spaced sections, yielding means urging the spaced sections in the angle increasing direction, locking means to hold the sections in a low angle position, and manually operable means to release said locking means.

12. In a hub for a rotary winged aircraft having wings adapted to rotate at an angle of incidence and to oscillate vertically, a rotatable shell including spaced sections, means to vary the angle of incidence of the wings upon rotational displacement of the spaced sections, locking means to hold the sections in a fixed angle position, manually operable means to release said locking means, and yielding means to urge the spaced sections in a direction to vary the angle of incidence of the wings when said locking means is released.

13. In a hub for a rotary winged aircraft having a fuselage and wings adapted to rotate at an angle of incidence, a rotatable shell including spaced sections having cooperating bearing surfaces, means to vary the angle of incidence of the wings upon rotational displacement of the spaced sections, means to rotationally displace said sections to vary the angle of incidence of the wings, and yielding means interposed between the hub and the fuselage to influence the operation of the last named means when the aircraft is subjected to unnatural forces.

14. A hub for a rotary winged aircraft having wings adapted to oscillate vertically independently about a common point at the center of the hub comprising a generally vertically disposed driving member, a rotatable shell, universal driving means between the driving member and the rotatable shell, and means to tilt the rotatable shell with reference to the driving means.

15. A hub for a rotary winged aircraft comprising a generally vertically disposed driving member, a rotatable shell, universal driving means between the driving member and the rotatable shell, means to tilt the rotatable shell with reference to the driving means, a plurality of wing root segments extending into the rotatable shell and adapted to oscillate vertically with reference thereto, and means to vary the angles between the wing root segments and the rotatable shell.

16. A hub for a rotary winged aircraft comprising a generally vertically disposed driving member, a rotatable shell, universal driving means between the driving member and the rotatable shell, a plurality of wing root segments extending into the rotatable shell, means including generally vertically disposed raceways between the wing root segments and the rotatable shell and anti-friction means in the raceways to permit vertical oscillation of the wing segments about the center of the hub, and means to vary the angles between the wing segments and the rotatable shell.

17. In a hub for a rotary winged aircraft having rotatable wings adapted to oscillate vertically independently about a common point at the center of the hub, a rotatable shell, means to drive the rotatable shell, means engaging the rotatable shell to vary the angle between the shell and the driving means to directionally control the aircraft, and manually operable means to actuate the angle varying means to directionally control the craft.

18. In a hub for a rotary winged aircraft having vertically oscillable rotatable wings mounted to oscillate independently about a common point at the center of the hub, a rotatable shell, means to drive the rotatable shell, means engaging the rotatable shell to vary the longitudinal and the lateral angles between the shell and the driving means to directionally control the aircraft, and means including spaced motion imparting means to move the shell to vary said longitudinal and lateral angles to directionally control the craft.

GEORGE S. SCHAIRER.